United States Patent

[15] 3,648,511

Groat et al.

[45] Mar. 14, 1972

[54] TESTING DEVICE FOR BRAKES AND BRAKE MATERIAL

[72] Inventors: Craig R. Groat, Pontiac; Manfred R. Happold, Farmington, both of Mich.

[73] Assignee: Link Engineering Company

[22] Filed: Apr. 3, 1970

[21] Appl. No.: 25,313

[52] U.S. Cl. .................................................. 73/9, 73/121
[51] Int. Cl. .................................................. G01n 3/56
[58] Field of Search ........................... 73/9, 7, 129, 121

[56] References Cited

UNITED STATES PATENTS

| | | | |
|---|---|---|---|
| 3,444,720 | 5/1969 | Link | 73/9 |
| 3,451,253 | 6/1969 | Happold | 73/9 |
| 3,360,977 | 1/1968 | Herman | 73/9 |

Primary Examiner—S. Clement Swisher
Assistant Examiner—Daniel M. Yasich
Attorney—Harness, Dickey & Pierce

[57] ABSTRACT

Alternate brake discs with or without pads of brake material thereon are keyed to a stator and rotor to have alternate discs rotate relative to those in-between. Pressure is applied to one side of the stacked discs by a plurality of pistons urged toward the discs with a predetermined selected pressure. Two sets of a plurality of pistons are employed, the pistons of each group being spaced equal distances apart and alternately located with those of the other group so that uniform pressures will be provided to a pressure plate whether one, the other or both groups are employed for applying the desired pressure between the stack of brake discs during the testing thereof. The arrangement is such as to permit the bleeding off of any collected air within the piston cylinders before being pressurized by fluid which may leak from the forward end of cylinders to be collected and returned to the tank. A plurality of equally spaced air cylinders returns the pressure plate in the opposite direction to retract the pistons to a stop position. The pistons have convex arcuate ends which engage concave arcuate surfaces of floating heads which are supported by the pressure plate, the arcuate engagement being retained when the pistons are retracted by a slight pressure on the fluid delivered to the end of the cylinders.

16 Claims, 9 Drawing Figures

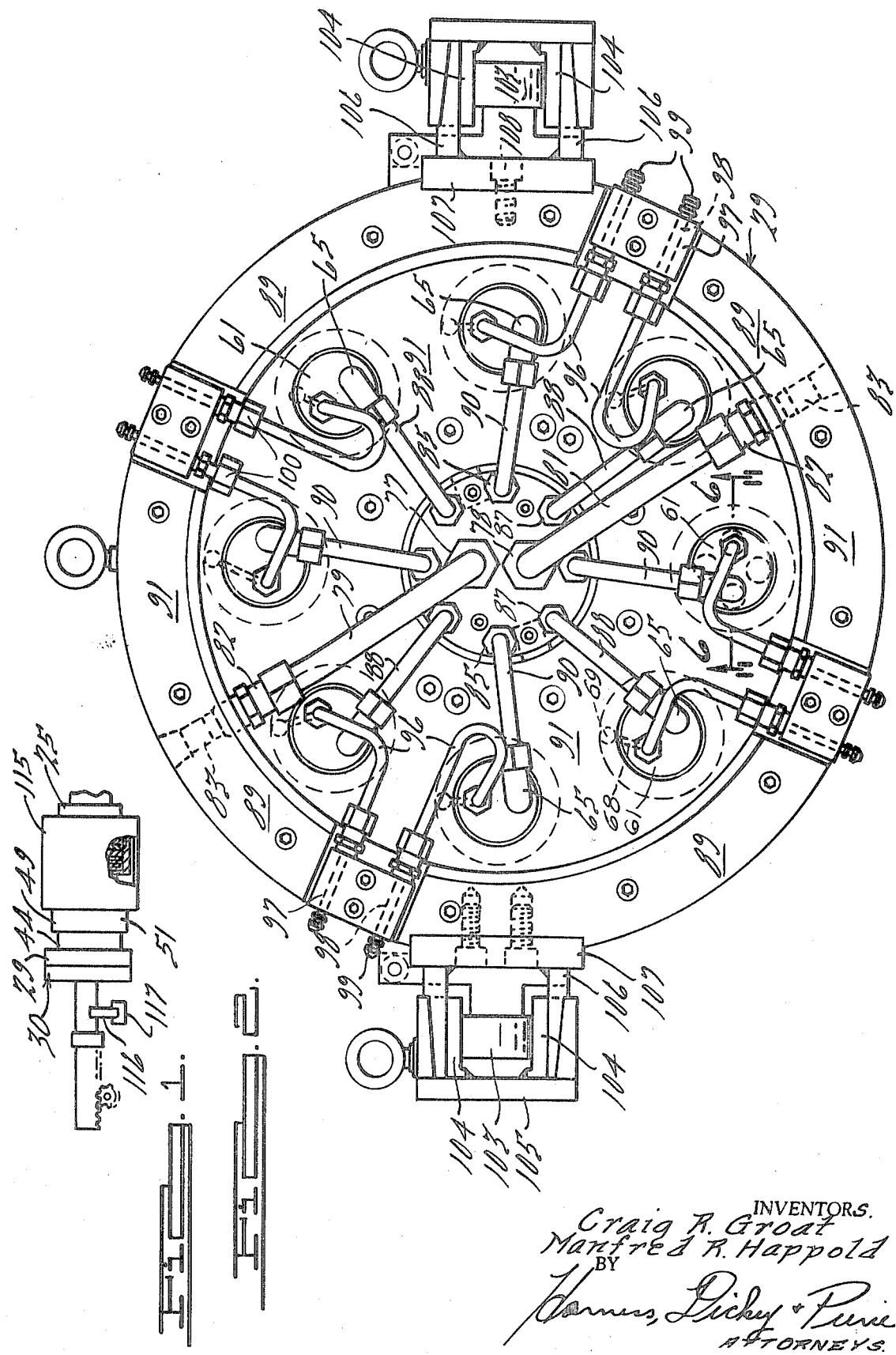

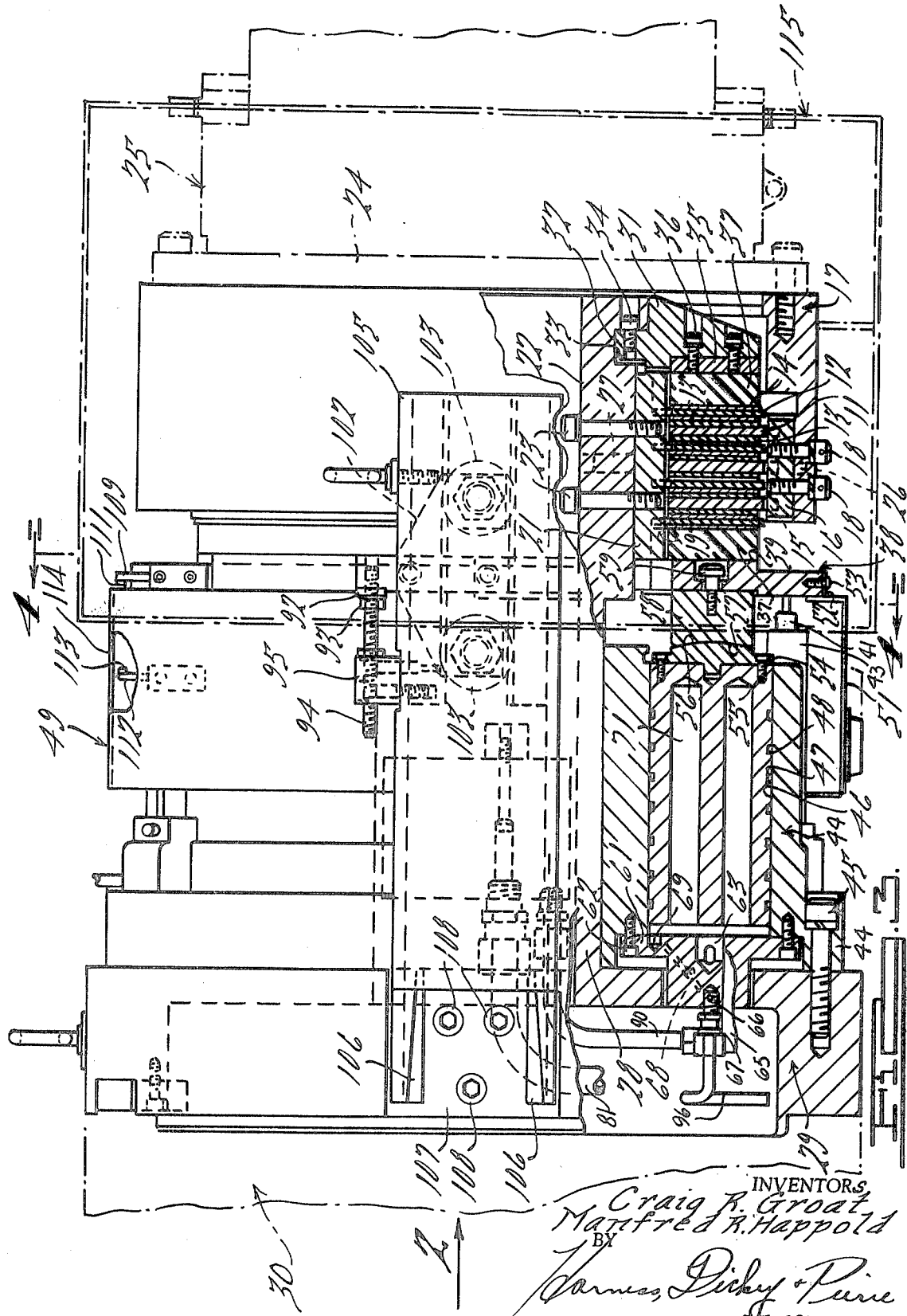

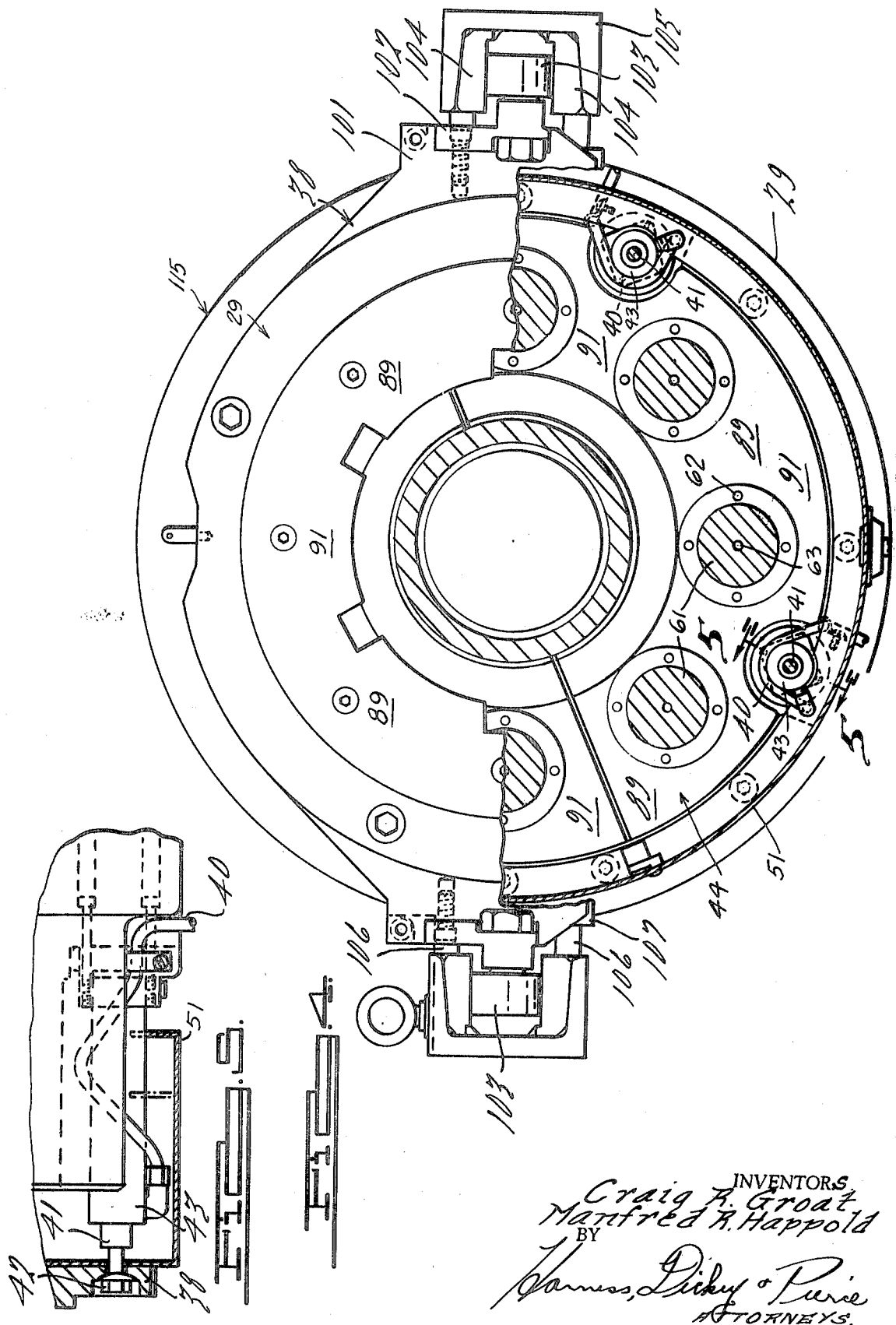

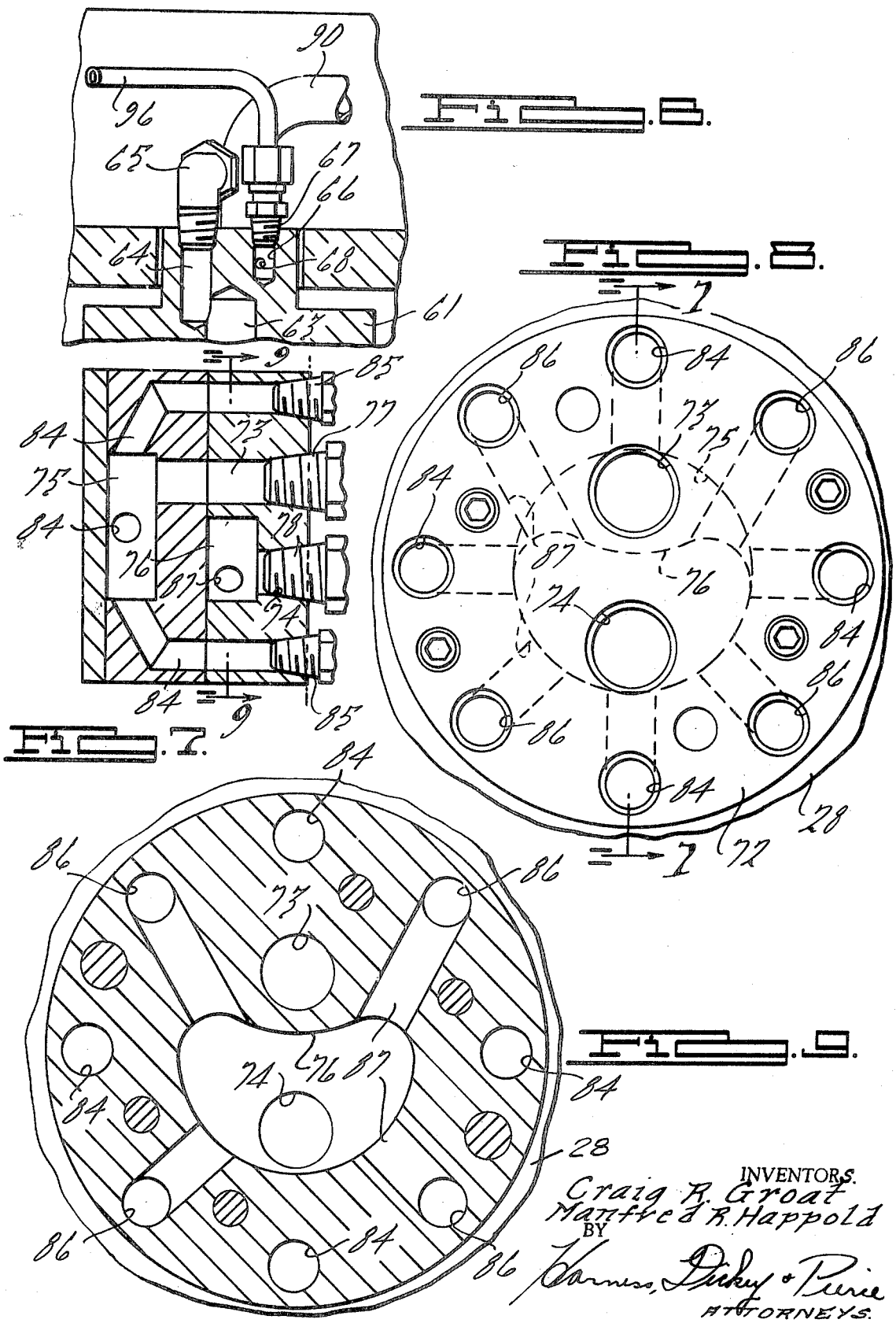

TESTING DEVICE FOR BRAKES AND BRAKE MATERIAL

BACKGROUND OF THE INVENTION

Reference may be had to the U.S. Pat. to Happold et al., No. 3,451,253, issued June 24, 1969 for "Brake Lining Testing Machine" to show the testing of brake material for a disc brake.

SUMMARY OF THE INVENTION

The invention is related to frictional testing of brake materials or pads in order to determine the wear characteristics of the brake materials. The brake materials or pads are mounted on a plurality of interleaved rotor and stator discs.

The stator portion of the testing device is mounted on a retractable tail stock on which one or a plurality of brake discs having notches on the inner periphery are keyed against rotation. Additional rotor discs are disposed between the stator disc having notches on the outer periphery which are keyed to a rotor which is driven at desired speeds. A pressure plate is carried by the stator to engage the ends of the stacked discs forcing them together with a predetermined pressure provided by a plurality of pistons. The pistons are mounted in cylinders in equal spaced relation to each other and is illustrated herein as being mounted in two groups of four pistons each. The groups may be employed alone or together depending on the amount of pressure to be exerted on the brake disc stack. Fluid is applied to the ends of the cylinder from a manifold constructed in a manner so that equal pressures will be applied to each of the four cylinders of each group.

The extending end of the pistons have a convex arcuate head which engages a concave arcuate surface of floating heads which are attached to the pressure plate in a manner to permit movement therebetween. Equally spaced air cylinders are employed for returning the pressure plate and pistons to their initial positions against a stop which prevents the pistons from engaging the bottom of the cylinders. A slight pressure of fluid is applied to the rear end of the pistons to maintain the arcuate surface of the pistons and heads in contact at all times. The driving of the rotor rotates the discs keyed thereto relative to the discs on the stator and the pressure applied to the pressure plate by the pistons produces a force between the engaged surfaces of the discs. A torque arm may be provided on the tail stock which applies a force to a pressure indicating pad so the torque can be read as the test proceeds. An enclosing housing is provided about the disc through which ambient air may be passed and theremocouples may be applied to the disc brake area to record the temperatures occurring during the test. A housing is also provided on the pressure plate extending beyond the forward end of the cylinders for catching any fluid which may leak about the pistons at the open ends of the cylinders and returning the fluid to tank.

The fluid delivered to each section of the manifold for the two groups of pistons may have its pressure controlled by a pressure regulating valve in the normal manner so that a selected pressure will be delivered to the cylinders of each of the groups separately or collectively depending upon the amount of force to be employed during the test. A pair of channel shaped rails are supported by the nonrotatable member which are engaged by rollers on the pressure plate to prevent the rotation thereof when the one set of discs is being driven. The torque on the tail stock can be recorded by a torque arm attached thereto. A manifold is mounted on the center of the nonrotatable member and the pistons are mounted in a circle about the center. Bleed lines are connected to the tops of each of the cylinders to bleed off any air collected from the fluid within the cylinder from time to time to make certain that a solid stand of fluid is present therein during the test operation.

BRIEF DESCRIPTION OF THE DRAWINGS

FIG. 1 is a schematic view of a device having a stack of brake discs applied thereto in a manner conforming to the present invention;

FIG. 2 is a view of the structure illustrated in FIG. 3, as viewed from the point 2 thereof;

FIG. 3 is a view in side elevation of the structure illustrated in FIG. 2, with parts in section;

FIG. 4 is a broken sectional view of the structure illustrated in FIG. 3, taken on the line 4—4 thereof;

FIG. 5 is an enlarge broken sectional view of the structure illustrated in FIG. 4, taken on the line 5—5 thereof;

FIG. 6 is an enlarged broken sectional view of the structure illustrated in FIG. 2, taken on the line 6—6 thereof;

FIG. 7 is a sectional view of the manifold illustrated in FIG. 8, taken on the line 7—7 thereof;

FIG. 8 is an enlarged view of the structure illustrated in FIG. 7, as viewed from the right-hand side thereof with the fittings removed, and FIG. 9 is an enlarged sectional view of the structure illustrated in FIG. 7, taken on the line 9—9 thereof.

DESCRIPTION OF THE PREFERRED EMBODIMENT

The device of the present invention is employed for testing a set of brake discs such as are used on wheels which comprises a plurality of rotor discs 11 and a plurality of stator discs 12, as shown in FIG. 3. The discs are of washer shape and provided with pads 13 on opposite sides of the rotor discs 11 and pads 14 on opposite sides of the stator disc 12. The pads are made of conventional friction material and may be of like material or of different material on the rotor and the stator discs. The rotor discs have a plurality of notches 15 on the outer peripheral wall which pass longitudinally over a plurality of circumferentially spaced keys 16 secured to a cylindrical drive flange 17 by a plurality of screws 18. The inner peripheral edge of the stator disc 12 is provided with notches 19 at a plurality of equally spaced points which receive keys 21 secured to a cylindrical nonrotatable element 22 by screws 23. Thus, the stator disc will be maintained stationary as the rotor discs 11 are driven by the cylindrical drive flange 17 which is secured to a flange 24 of a driving hub 25 driven from a motor (not shown) in the conventional manner. A plurality of thermo couples 26 and 27 are imbedded in the cylindrical flange 17 and cylindrical element 22, respectively, for obtaining temperature readings adjacent to the stack of brake discs being tested. The thermo couple 26 is connected through one or more pairs of commutator rings supported on the hub 25 to a recording instrument. The cylindrical element 22 forms an end on a cylindrical sleeve 28 which has an outwardly extending flange 29 on the outer end. The flange is secured to a tail stock 30 which withdraws the sleeve 28 and cylindrical element 22 away from the hub 25 to thereby move the brake disc stack from the keys 16 and to permit the removal thereof from the key 21. A cylindrical backup plate 21 is washerlike in shape and split into two halves so that an inner flange 32 can project within a slot 33 on the outer periphery of the element 22. The two halves are secured in position by a plurality of screws 34. The two halves of the backup plate 31 have two halves of a retainer 35 secured thereto by screws 36. A hard insulating washer 37 is applied to each end of the stack in engagement with the end stator discs. When the assembly including the cylinder 22, sleeve 28 and flange 29 are moved away from the hub 25 and the brake disc stack from the keys 16, the removal of the backup plate 31 permits the brake discs stack to be slid from the end of the cylinder 22 off of the keys 21. The stack of discs may be examined and further tested or a new brake disc stack applied to the cylinder 22 employing the two insulating washers 37 on each side and securing the half elements of the backup plate 31 to the cylinder 22. The slots 15 in the rotor discs 11 are aligned with the keys 16 and the assembly is again moved forward to be in the position illustrated in FIG. 3.

A washerlike pressure plate 38 has an extending face 39 which engages the adjacent insulating washer 37 for applying pressure to the stack. As illustrated in FIG. 5, the pressure plate has screws 42 supporting pistons 41 of air cylinders 43 herein illustrated as four in number equally spaced about the cylinder 22. A cylindrical sleeve 44 diametrically split to provide two halves is assembled about the sleeve 28 and is secured to the flange 29 by a plurality of screws 45. The sleeve 44 is preferably made of aluminum and is provided with a plurality of cylinders 46 herein illustrated as eight in number although any number may be employed for supporting pistons 47 for movement outwardly of the cylinders. The inner surface of the piston cylinders 46 and the outer surface of the pistons 47 are provided with a very hard anodized surface which is lapped and polished with a calculated amount of clearance between the surfaces when assembled in order to maintain the oil flow necessary to float the pistons on a film of oil. The pistons are provided with a plurality of annular slots 48 to trap the fluid between the cylinder and piston walls and provides turbulence thereto to limit the escape of fluid and have the pistons float on a film thereof. A calculated amount of fluid will escape from the front of the cylinder and this will be caught in an upper drip pan section 49 and a lower drip pan section 51 which are secured to the peripheral edge of the pressure plate 38 by tabs 52 secured by screws 53 as illustrated in FIG. 3. A nose 54 is secured to the outer end of the piston by screws 55 to provide a concave arcuate surface 56 on the end of each piston. The arcuate surface 56 engages a concave arcuate surface 57 on push plates 58 which are movable relative to the pressure plate 38 when secured thereto by screws 59 which has clearance with the pressure plate apertures. Any movement to the pressure plate due to the applied torque during the test operation can be absorbed by the movement between the pressure plate and the push plates 58 thereby maintaining the arcuate surfaces 56 and 57 in area contact at all times.

The end of each piston cylinder 46 is sealed by a plate 61 secured to the end of each cylinder by screws 62. The plate has a central aperture 63 which communicates with an aperture 64 to which an elbow fitting 65 is connected as illustrated more specifically in FIG. 6. This introduces the pressure fluid to the rear end of the piston at the center of the cylinders 46. The plate 61 has an aperture 66 to which a fitting 67 is connected in communication with a passageway 68 which is connected to an aperture 69 at the top of the cylinder for the purpose of bleeding any air out of the fluid system which may collect at the top portion of each of the piston cylinders 46. As illustrated in FIGS. 2 and 3, each of the pistons 47 has four apertures 71 extending therein from the bottom end for reducing the inertia thereof and for the application of some of the fluid directly to the outer closed end of the piston.

As illustrated in FIGS. 7, 8 and 9, manifold 72 is supported within the sleeve 28 having intake passageways 73 and 74 to chambers 75 and 76, respectively. The passageways 73 and 74 have fittings 77 and 78 connected thereto to which conduits 79 and 81 for pressure fluid are connected. The conduits 79 and 81 are connected by fittings 82 to a passageway 83 in the flange 29 to which flexible fluid delivery conduits are connected. Four passageways 84 spaced 90° apart lead from the chamber 75 to fittings 85 which are joined by the conduits 90 to the fittings 65 connected to the end of each of the four cylinders 46 located at the positions 91. Passageways 86 are spaced 90° apart and equally spaced from the passageways 84 and are joined by fittings 87 to conduits 88 which are connected by the fittings 65 to the four cylinders 46 located at the positions 89 which form a first group, the other four cylinders at the positions 91 forming the second group. With this construction when fluid is admitted through the conduit 79, to the chamber 75, the cylinders 46 at the positions 91 will have pressure fluid delivered thereto and the four pistons equally spaced apart will apply equal pressure to the pressure plate 38. On the other hand, fluid may be admitted through the conduit 81 to the chamber 76 in which case, the pistons in the cylinders 46 located at the positions 89 will apply equal pressure at equally spaced points to the pressure plate 38. A regulator valve controls the amount of pressure which is delivered to either of the conduits 79 and 81. Similarly, when fluid is delivered through both of the conduits 79 and 81 all of the cylinders 46 located at the positions 89 and 91, will be pressurized to apply uniform pressure at evenly spaced points to the pressure plate 38 for applying greater pressure to the pressure plate 38 and the assembly of disc brakes.

The four equally spaced air cylinders 43 attached to the pressure plate 38 has an air conduit 40 attached to the outer end of the cylinder for retracting the pressure plate 38 and the pistons 47 after completing a test on the brake disc assembly, as illustrated in FIGS. 4 and 5. A pair of stop buttons 92 are carried by the pressure plate 38, as illustrated in FIG. 3, disposed 180° apart for engagement with a head 93 of a screw 94, the position which is adjusted within a boss 95. The heads 93 are adjusted to maintain the ends of the pistons 47 spaced from the plates 61 a short distance to prevent the engagement therebetween when the pistons are retracted. Up to 100 pounds of air pressure is employed to retract the plate 38 and a small fixed pressure in the nature of ½ p.s.i. is applied by the fluid to the pistons 41 to provide an outward force in the same direction as the retractive force to maintain the arcuate surfaces 56 and 57 in engagement with each other at all times. The fittings 67 to the bleedoff passageways 68 are connected by a conduit 96 to blocks 97, herein illustrated as four in number, with pairs of adjacent conduits 96 connected to each of the blocks by special fittings 100. The fitting 100 shuts off the flow of fluid through the conduits 96 but, which when backed off, will open the fitting to passageways 98 in the block to fittings 99 to which tubes are connected for collecting the excess fluid which is bled off from the top part of the cylinders 89 and 91. Such a bleeding operation may be performed before each test to make certain that a solid stand of fluid is delivered at all times to each group of cylinders 46 located at the positions 89 or 91 or both which is being pressurized.

To overcome the torque which will be applied directly to the pressure plate 38 during a test operation, diametrically disposed extensions 101 are provided thereon for supporting a bracket 102 carrying a pair of rollers 103. The rollers are engageable with the top or bottom rails 104 carried on the inner arms of a pair of diametrically disposed channel elements 105. The channel elements are welded to arms 106 on a plate 107 which is secured to the flange 29 by a screw 108, as illustrated in FIG. 3. The rollers will roll between the rails 104 as the pressure plate 38 is advanced to apply the pressure between the brake disc being tested. The rollers retain the pressure plate 38 in predetermined relation to the adjacent insulating element 37 and the stack of brake discs. All of the torque on the stator brake discs is taken by the cylinder 22, sleeve 28 and flange 29, the latter being attached to the tail stock 30 which is reciprocal. A torque arm 116 on the tail stock in contact with a pressure pad 117 will register the applied torque as the brake disc stack is being tested.

To measure the wear on the pads 13 and 14 of the rotor and stator discs 11 and 12, an arm 109 having a contact tip 111 on the pressure plate 38 is disposed opposite an arm 112 and a contact tip 113 on the sleeve 44. A measurement between the tips 111 and 113 before and after tests with a predetermined pressure applied to the pistons 47 will give a reading of the wear which occurred in the stack of brake discs during the test. The top drip pan 49 has a slot 114 therein so that calipers can be applied between the contact tips 111 and 113.

In operation, upon the retraction of the tail stock 30 attached to the flange 29, the entire support for the brake discs 11 and 12 is moved away from the hub 25 sliding the rotor disc 11 from the keys 16 and exposing the end plate 31 which is removed to have the insulating washers and the set of brake discs slid from the keys 21 which registered with the slots in the stator discs 12. Thereafter, the insulating washer 37 and a new set of brake discs and a second insulating washer 37 may be slid over the keys 21 and the two halves of the backup plate 31 secured in position. Thereafter, the tail stock and the stator supporting structure is moved forwardly to slide the rotor discs slots over the keys 16 into the position illustrated in FIG. 3. Any air in the cylinders 46 may be bled therefrom through the bleed passageways 68, as pointed out hereinabove. Pressure is applied to one or both groups of cylinders 89 and 91 for moving the pistons thereof forwardly and applying pressure to the pressure plate 38 and to the stator and rotor discs 11 and 12. Temperature and torque readings may be taken during the test which simulates as closely as possible the brake operation occurring during the landing of an airplane. To this end, a housing 115 encompasses the brake disc stack over which air is blown to simulate the cooling of air encountered by the brake unit while the airplane is landing. After the test operation, during which temperature and torque may be recorded, the pistons 47 are retracted by the movement of the pressure plate 38 upon the application of air to the cylinders 43. A slight fluid pressure is maintained within the cylinders 46 to maintain the piston 47 in forward position with the arcuate faces 56 and 57 maintained in contact at all times. During the test operation, the torsional force on the pressure plate 38 is overcome by the rollers 103 engaging the rails 104 secured to the flange 29. As illustrated in FIG. 1, a shaft on the tail stock 30 has a torque arm 116 secured thereto for measuring the torque between the motor and stator brake discs from a pressure pad 117 or other recording device engaged by the torque arm. After the test operation, the amount of wear to the brake disc pads 13 and 14 may be obtained by comparing caliper readings taken between the contact tips 111 and 113 before and after the test operation with like pressure applied to the brake disc stack.

We claim:

1. In a device for testing brakes and brake material, a driven member, an advanceable and retractable member within said driven member, means for retaining said advanceable and retractable member against rotation, rotor and stator discs forming a brake disc stack to be tested, means on the driven member for securing the rotor brake discs of said brake disc stack in fixed relation thereto, means on said member retained against rotation for securing the stator brake discs of said brake disc stack in fixed relation thereto, a pressure plate for applying pressure to said brake disc stack, and means preventing the rotation of said pressure plate while applying pressure on said brake disc stack as the rotor discs are being driven.

2. In a device for testing brakes and brake material as recited in claim 1, wherein upon the retraction of said member retained against rotation, the brake disc stack is separated from said driven member.

3. In a device for testing brakes and brake material as recited in claim 2, wherein a backup plate is carried by said member retained against rotation which when retracted said backup plate is removable to permit the brake disc stack to be removed.

4. In a device for testing brakes and brake material as recited in claim 3, wherein an insulating washer is applied to the endmost discs of the brake disc stack between which pressure from the pressure plate is applied to the brake disc stack.

5. In a device for testing brakes and brake material as recited in claim 4, wherein thermocouples are mounted in said driven member and in said member retained against rotation in the region of said brake disc stack.

6. In a device for testing brakes and brake material as recited in claim 1, wherein equally spaced cylinders have pistons therein which apply pressure to the pressure plate.

7. In a device for testing brakes and brake material as recited in claim 6, wherein alternate pistons and cylinders form two groups, and means for supplying fluid pressure to either or both of the cylinders of said groups.

8. In a device for testing brakes and brake material as recited in claim 6, wherein the pistons and cylinders are made of aluminum with the mating surfaces thereof anodized and polished to provide a hard finish thereto.

9. In a device for testing brakes and brake material as recited in claim 6, wherein the pistons extend from the open end of the cylinders, and floating plates on said pressure plate engaged by said pistons to permit relative movement to occur between the pistons and the pressure plate.

10. In a device for testing brakes and brake material as recited in claim 9, wherein air cylinders are secured to the pressure plate for retracting the pressure plate and returning the pistons to their initial position within the cylinders.

11. In a device for testing brakes and brake material as recited in claim 10, wherein adjustable stop means limits the retractive movement of the pressure plate to prevent the pistons from striking the bottom of the cylinders, and wherein fluid pressure within the cylinders maintains the pistons in engagement with the floating plates supported on the pressure plate.

12. In a device for testing brakes and brake material as recited in claim 7, wherein said member retained against rotation has a manifold on the central axis thereof containing two chambers joined to the two groups of cylinders which are equally spaced from the chambers into which pressurized fuel is selectively delivered.

13. In a device for testing brakes and brake material as recited in claim 12, wherein one chamber delivers fluid to the one group of cylinders, each group of cylinders being equally spaced from the chambers to have like fluid pressure delivered to the cylinders of the group the chambers being pressurized individually or collectively.

14. In a device for testing brakes and brake material as recited in claim 1, wherein a gauge button is mounted on the pressure plate and a second gauge button is mounted on the member retained against rotation in aligned relation the spacing between which before and after the test operation provides an indication of the wear on the stack of brake discs occurring during the test operation.

15. In a device for testing brakes and brake material as recited in claim 1, wherein the rotation-preventing means embodies at least one extending fixed rail on the member retained against rotation, and wherein said pressure plate is provided with a contact member which is capable of being moved along said rail when in engagement therewith for retaining the pressure plate against rotation.

16. In a device for testing brakes and brake material as recited in claim 1, wherein said rotation-preventing means embodies diametrically disposed rail means on the member retained against rotation engaged by roller means on opposite sides of the pressure plate for restricting the relative rotative movement between the pressure plate and the member retained against rotation.

* * * * *